(No Model.) 2 Sheets—Sheet 2.
D. R. PROCTOR.
CIRCULAR SAWING MACHINE.
No. 368,618. Patented Aug. 23, 1887.
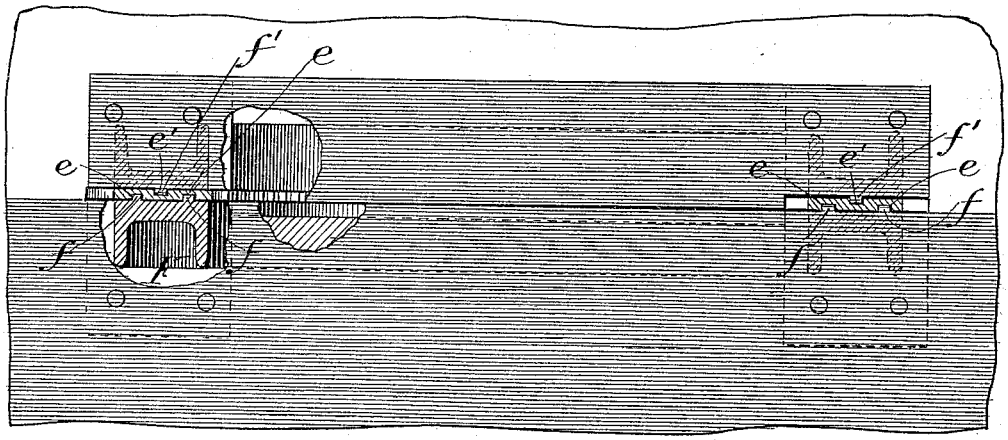
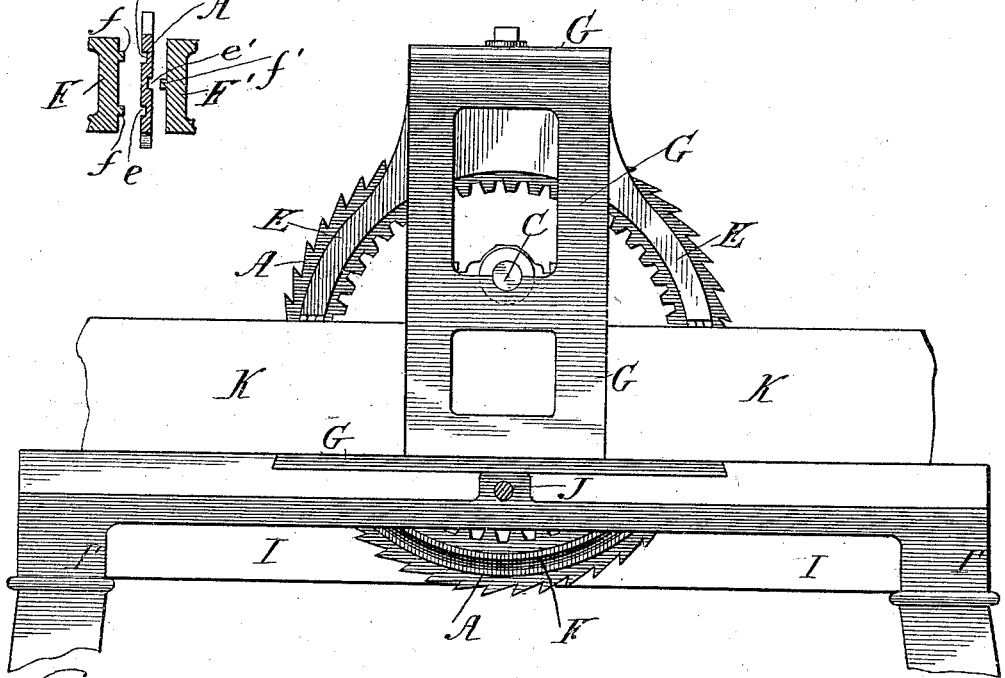
Witnesses:
Harry T. Jones.
O. W. Bond.
Inventor:
David R. Proctor

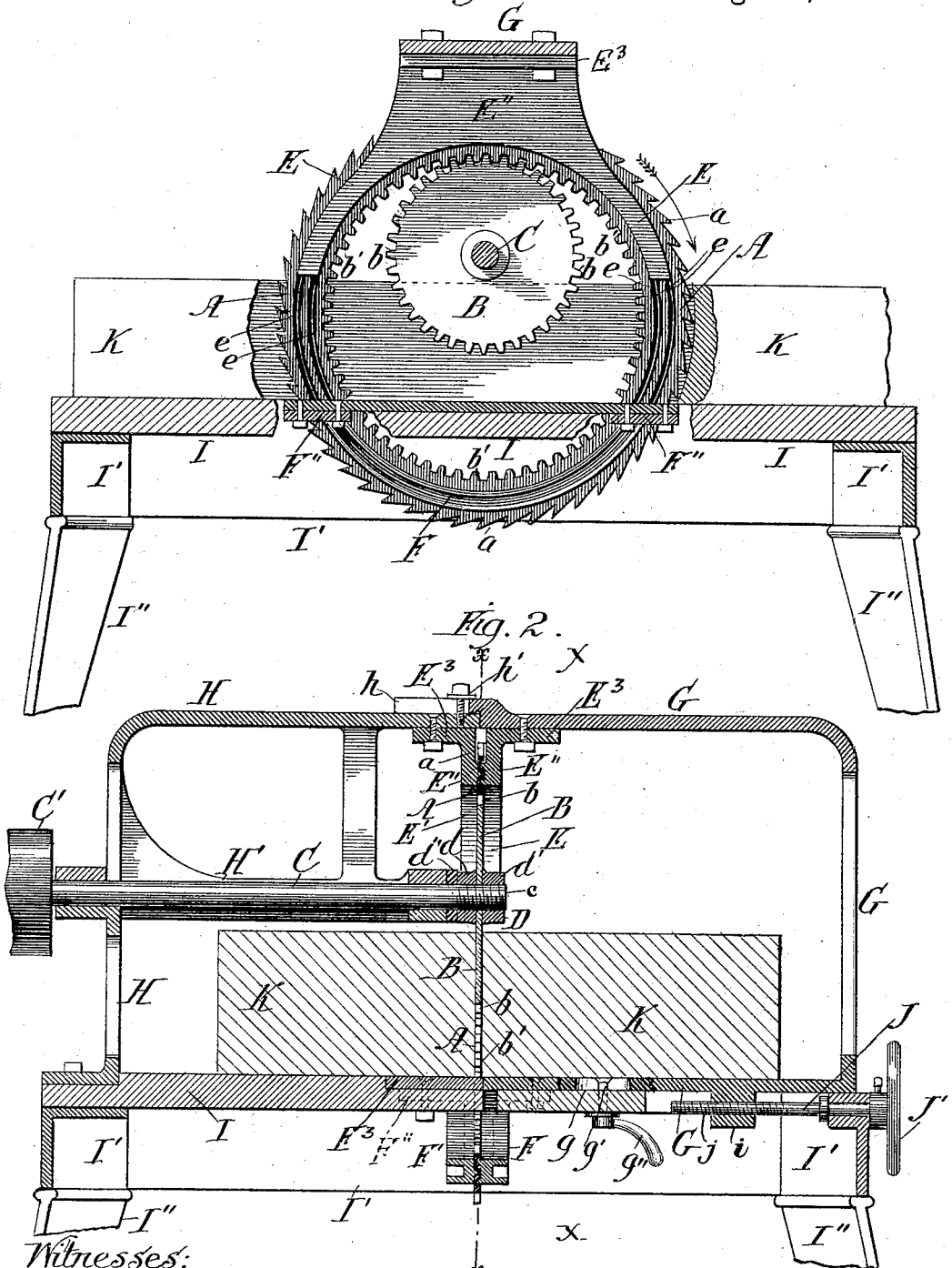

UNITED STATES PATENT OFFICE.

DAVID R. PROCTOR, OF CHICAGO, ILLINOIS, ASSIGNOR TO HIMSELF AND SIDNEY W. SEA, OF SAME PLACE.

CIRCULAR SAWING MACHINE.

SPECIFICATION forming part of Letters Patent No. 368,618, dated August 23, 1887.

Application filed February 15, 1887. Serial No. 227,742. (No model.)

*To all whom it may concern:*

Be it known that I, DAVID R. PROCTOR, residing at Chicago, in the county of Cook and State of Illinois, and a citizen of the United States, have invented a new and useful Improvement in Circular Sawing Machines, of which the following is a full description, reference being had to the accompanying drawings, in which—

Figure 1 is a longitudinal section on line $x\,x$ of Fig. 2; Fig. 2, a central cross-section; Fig. 3, a top or plan view with the upper support and the frame-work removed, and showing also the saw and one of the saw-supports in section; Fig. 4, an end elevation with the driving-wheel removed; Fig. 5, a detail in section of the saw and the guide and support.

This invention has for its objects to give the cut of the saw a direction to correspond with that of the grain of the wood being cut, to bring the driving-power near the point of resistance and remove the strain on the saw in use, to overcome any lateral motion in use and prevent clatter of the blade and maintain the saw in a straight line of cut and prevent deviation in cutting through knots or gnarls, to give the saw a less surface in traveling and thereby produce a less amount of friction in use and enable the lumber to be cut with a less amount of power, and to improve, generally, the construction and operation of the saw and its supporting and driving devices; and its nature consists in the parts and combination of parts hereinafter described, and pointed out in the claims as new.

In the drawings, A represents the blade of the saw, having its periphery provided with teeth $a$ and formed of a ring of steel varying in width from two to six inches, according to the size of the saw.

B is the driving-wheel, provided on its periphery with cogs $b$, which mesh with cogs $b'$ on the inner edge of the saw-blade, as shown in Fig. 1, so that the rotation of the wheel B will drive the saw A.

C is the arbor or shaft on which the wheel B is mounted, which shaft can be driven from a driving-pulley, C', or other driving device by any motive power.

D is a clamp for locking the gear-wheel B onto the arbor C, which clamp, as shown, is formed in two sections or halves, $d\,d'$, both of which are screw-threaded to receive the screw-threaded end $c$ of the arbor C. The section $d$ is screwed onto the arbor and the gear B slipped onto the end of the arbor and there locked by screwing down the section $d'$, and these sections $d\,d'$ enable an accurate adjustment to be had for the wheel B to properly line with the saw-blade, and, as shown, in order to prevent unscrewing of the sections $d\,d'$ in use, a loose washer, $d''$, is located between the section $d$ and the box supporting the arbor C.

E E' represent the upper guide and support for the saw-blade, one located on each side of the blade when the parts are in position, as shown in Figs. 1 and 2. Each support extends down parallel with the blade on each side of the driving-wheel B, as shown in Fig. 1, and is formed with a body or carrying portion, E'', which has an extension or flange, E³, by means of which the guide and support can be attached to the frame by bolts or otherwise.

F F' represent the lower guide or support for the saw, one located on each side of the saw-blade, and formed of a semicircular piece attached at each end to a base or plate, F'', as shown in Figs. 1 and 2, by means of which plate F''' the guide and support can be attached in position by suitable bolts or otherwise. The guide E and the guide F coincide when the parts are together, and the guides E' F' likewise coincide. The face of the saw A on the side adjacent to the guides E F is provided with two grooves, $e$, into which corresponding tongues, $f$, on the guides E F enter, and the face of the saw adjacent to the guides E' F' is provided with a single groove, $e'$, which receives a tongue, $f'$, formed on the guides E' F'; but it is evident that the double groove could be on the side for the guides E' F', and the single groove on the side for the guides E F, and the number and form of the grooves and tongues can be varied, so long as they act to furnish a support by which the saw-blade is held in position between the guide and support E E' and F F'.

G is a frame formed of iron or other suitable material to have an upper portion, a vertical end, and a base or lower portion, as shown in Fig. 2. The upper portion has secured thereto by suitable bolts the flange E³ of the body E″ of the guide and support E. The base portion has secured thereto by suitable bolts the flanges F″ of the guide and support F, and this frame G is movable, so that it can be advanced and withdrawn to support the saw-blade or allow the blade to be detached.

H is a frame formed of an upper portion and a vertical end portion bolted or otherwise firmly attached to the table, and this frame has a horizontal portion, H′, on which are the journal-boxes of the arbor C, as shown in Fig. 2. The upper portion of this frame H has attached thereto by the flange E³ the guide and support E′, the attachment being by means of bolts, as shown, and the guide and support F′ is attached in position by having its ears F″ bolted to a plate, F³, on the table. The upper portion of the frame G at its end laps over the end of the upper portion of the frame H in the form of construction shown, and is provided with a slot, h, through which the stem of a bolt, h′, passes, which bolt h′ enters the frame H, and by means of which the frames G H are locked together at their upper part, and the base or lower portion of the frame G is provided with a slot, g, through which a bolt, g′, passes, on the end of which is a hand-nut, g″, by means of which bolt and hand-nut the frame G can be firmly locked to the table. The slots g h allow of a movement of the frame G to withdraw the guides and supports E F the distance required to remove the saw-blade when required for any purpose, and such movement of the frame G is permitted by loosening the bolts g′ h′.

I is the table on which the piece of wood to be sawed is placed and to which the frames G H are attached, as above described. This table is mounted on a frame, I′, supported by legs I″.

J is a screw-threaded stem having on its outer end a hand-wheel, J′. The screw-threaded portion j of this stem enters a boss, i, also screw-threaded, on the base or lower portion of the frame G, so that by turning the stem J by the hand-wheel J′ in the proper direction the frame G can be advanced or withdrawn.

K is the piece of wood being operated upon.

The frame H is bolted or otherwise secured to the table I, and the guide E′ is attached to the frame H by bolts passing through the flange E³, and the guide and support F′ is attached to the plate F³ by bolts passing through the ears F″. The arbor C is placed in its boxes, and the section d of the clamp D screws onto the end of the arbor, with the washer d″, when used, between it and the end of the box. The saw is placed in position to have the groove e′ receive the tongue f′ on the guides and supports E′ F′. The wheel B is slipped onto the end of the arbor to have its cogs b mesh with the cogs b′ of the saw-blade A. The section d′ of the clamp D is screwed onto the end c of the arbor, locking the wheel B firmly in place, so that the rotation of the arbor will rotate the wheel B. The frame G, with the guides and supports E F attached thereto, is advanced, through the rotation of the stem J, until the grooves e of the saw-blade A receive the tongues f of the guides and supports E F and support the saw-blade, and when so advanced the frame G is locked in place by the clamping-bolts g′ h′, which completes the machine ready for use.

In use the piece of wood, K, to be sawed is placed on the table I and advanced toward the saw, and when in place the piece of wood lies below the arbor C. Power is applied to the arbor C through the pulley-wheel C′, to rotate such arbor and impart rotation to the wheel B, and cause such wheel to drive the saw-blade A in the direction for work, and in use among the advantages obtained will be found a direct cut with the grain, as the point of cutting is below the point of applying the power, producing a more direct and even cut. The saw is supported so as to run free, the guides and supports E E′ leaving but little friction to be overcome, so that the full power is applied to the work. The saw A being of a less width than the full radius, and the power being applied near its periphery, enables the power to act in close proximity to the resistance, thereby lessening the amount of power required. The guides by which the saw-blade is held and supported maintain the blade in a direct line of run, and also hold the blade steady against side wabbling and prevent side running, that would produce a clatter, the result being that the saw is made to run with but little noise, and by supporting and guiding the saw in the manner described it will be held to its work and not deviate when a knot or gnarl is cut. The blade not being of the full radius, it will be seen that in use it cannot become dished by overheating, as it has no center, and as the guides and supports by which the saw is held in place have one of them movable, it will be seen that one saw can be removed and replaced by a thicker or thinner one.

What I claim as new, and desire to secure by Letters Patent, is—

1. A circular saw consisting of an annular blade with cutting-teeth on its periphery and having grooves e e e′ on its opposite sides, in combination with guides and supports for carrying and guiding the saw, said guides being provided with tongues f f′, to engage the grooves in the sides of the saw-blade, substantially as described.

2. The saw-blade A, provided with grooves on its faces, in combination with the guides and supports E E′ F F′, provided with tongues to enter the grooves in the saw, substantially as described, and for the purposes specified.

3. The blade A, having grooves in its side faces, and guides and supports E E′ F F′, having tongues to enter the grooves of the saw, in combination with a movable frame carrying the guides and supports E F, substantially as and for the purposes specified.

4. The saw-blade A and gear-wheel B, in combination with the guides and supports E E' F F', for driving, carrying, and supporting a saw in use, said saw-blade being provided on its faces with grooves, and the guides being provided with tongues to engage said grooves, substantially as and for the purposes specified.

DAVID R. PROCTOR.

Witnesses:
O. W. BOND,
HARRY T. JONES.